United States Patent
Contente et al.

(10) Patent No.: US 6,241,846 B1
(45) Date of Patent: *Jun. 5, 2001

(54) APPARATUS FOR MANUFACTURING ELASTOMERIC ARTICLES

(75) Inventors: Audrey Contente, New York, NY (US); Wendell W. Guthrie, Missoula; Randy S. Wills, Florence, both of MT (US)

(73) Assignee: Ultrafem, Inc., San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/886,010

(22) Filed: Jul. 3, 1997

Related U.S. Application Data

(60) Provisional application No. 60/021,236, filed on Jul. 3, 1996.

(51) Int. Cl.$^7$ .......................... B29C 31/08; B29C 51/10; B29C 65/20
(52) U.S. Cl. .......................... 156/378; 156/379; 156/500; 156/522; 156/566; 156/245; 156/308.2; 425/388; 264/553; 604/330
(58) Field of Search .................... 156/221, 224, 156/245, 285, 500, 522, 566, 499, 308.2, 378, 379, 443, 515, 556; 264/553; 425/504, 388; 604/330

(56) References Cited

U.S. PATENT DOCUMENTS

| | | |
|---|---|---|
| 71,414 | 11/1867 | Rohleder . |
| 1,083,721 | 1/1914 | Asch . |
| 1,891,761 | 12/1932 | Goddard . |
| 1,986,504 | 12/1935 | Cubbon . |
| 1,996,242 | 4/1935 | Hagedorn . |
| 2,024,539 | 12/1935 | Schmid . |
| 2,061,384 | 11/1936 | Manegold . |
| 2,079,022 | 5/1937 | Martin . |
| 2,324,656 | 7/1943 | Vincent . |
| 2,443,943 | 6/1948 | Young . |
| 2,529,363 | 11/1950 | Ballard et al. . |
| 2,534,900 | 12/1950 | Chalmers . |
| 2,616,426 | 11/1952 | Gordon . |
| 2,697,057 | 12/1954 | Senger et al. . |
| 2,915,065 | 12/1959 | Lyons et al. . |
| 3,036,570 | 5/1962 | Milgrom et al. . |
| 3,037,508 | 6/1962 | Friedman . |
| 3,042,029 | 7/1962 | Johansson . |
| 3,060,931 | 10/1962 | Clark . |

(List continued on next page.)

FOREIGN PATENT DOCUMENTS

| | | |
|---|---|---|
| 5471 | 12/1931 | (AU) . |
| 553547 | 6/1932 | (DE) . |
| 134671 | 3/1985 | (EP) . |
| 260600 | 10/1926 | (GB) . |
| 2218666 | * 11/1989 | (GB) . |
| 87/01581 | 3/1987 | (WO) . |

*Primary Examiner*—Michael W. Ball
*Assistant Examiner*—Michael A Tolin
(74) *Attorney, Agent, or Firm*—Dickstein Shapiro Morin & Oshinsky LLP

(57) ABSTRACT

An apparatus for manufacturing a device having a first elastomeric portion and a second elastomeric portion, the second elastomeric portion being formed into a non-planar shape, i.e., a vaginal discharge collection device that is formed of an elastomeric rim and a flexible film reservoir. The apparatus includes a loading station for loading a rim into a carrier plate, a heat seal station for laying and forming a film over the rim, a preheating station for preheating the rim and film, a forming station for drawing the film into a chamber by creating a vacuum to form the collector, and an unloading station for removing the collector from the carrier plate.

17 Claims, 16 Drawing Sheets

U.S. PATENT DOCUMENTS

| | | |
|---|---|---|
| 3,128,767 | 4/1964 | Nolan . |
| 3,169,522 | 2/1965 | Monett . |
| 3,216,422 | 11/1965 | Steiger et al. . |
| 3,404,682 | 10/1968 | Waldron . |
| 3,626,942 | 12/1971 | Waldron . |
| 3,841,333 | 10/1974 | Zalucki . |
| 3,845,766 | 11/1974 | Zöller . |
| 3,854,480 | 12/1974 | Zaffaroni . |
| 3,983,874 | 10/1976 | Davis et al. . |
| 4,012,496 | 3/1977 | Schöpflin et al. . |
| 4,198,965 | 4/1980 | Strickman et al. . |
| 4,198,976 | 4/1980 | Drobish et al. . |
| 4,200,090 | 4/1980 | Drobish . |
| 4,219,016 | 8/1980 | Drobish et al. . |
| 4,232,673 | 11/1980 | Bucalo . |
| 4,261,352 | 4/1981 | Sedlacek . |
| 4,286,587 | 9/1981 | Wong . |
| 4,286,593 | 9/1981 | Place et al. . |
| 4,300,544 | 11/1981 | Rudel . |
| 4,304,226 | 12/1981 | Drobish et al. . |
| 4,311,543 | 1/1982 | Strickman et al. . |
| 4,320,751 | 3/1982 | Loeb . |
| 4,326,510 | 4/1982 | Buckles . |
| 4,369,219 | 1/1983 | Goepp et al. . |
| 4,381,771 | 5/1983 | Gabbay . |
| 4,401,534 | 8/1983 | Goepp et al. . |
| 4,427,477 | 1/1984 | Milgrom . |
| 4,526,578 | 7/1985 | Wong . |
| 4,553,972 | 11/1985 | Vickery . |
| 4,589,880 | 5/1986 | Dunn et al. . |
| 4,607,630 | 8/1986 | Spits . |
| 4,613,269 * | 9/1986 | Wilder et al. ........................ 364/513 |
| 4,630,602 | 12/1986 | Strickman et al. . |
| 4,631,060 | 12/1986 | Place . |
| 4,640,272 | 2/1987 | Monett . |
| 4,648,867 | 3/1987 | Conner et al. . |
| 4,693,705 | 9/1987 | Gero . |
| 4,711,235 | 12/1987 | Willis . |
| 4,785,804 | 11/1988 | Tlapek et al. . |
| 4,795,422 | 1/1989 | Conner et al. . |
| 4,822,616 | 4/1989 | Zimmermann et al. . |
| 4,848,363 | 7/1989 | Cattanach . |
| 4,858,624 | 8/1989 | Shihata . |
| 4,883,071 | 11/1989 | Pickhard et al. . |
| 4,895,170 | 1/1990 | Tlapek et al. . |
| 4,923,440 | 5/1990 | Genaro . |
| 4,959,216 | 9/1990 | Daunter . |
| 4,961,436 | 10/1990 | Koch . |
| 5,002,540 | 3/1991 | Brodman et al. . |
| 5,044,376 | 9/1991 | Shields . |
| 5,207,232 | 5/1993 | Shihata . |
| 5,228,456 | 7/1993 | Karg et al. . |
| 5,231,992 | 8/1993 | Leon . |
| 5,295,984 * | 3/1994 | Contente et al. .................... 604/317 |
| 5,398,698 | 3/1995 | Hiller et al. . |
| 5,592,949 | 1/1997 | Moench et al. . |

\* cited by examiner

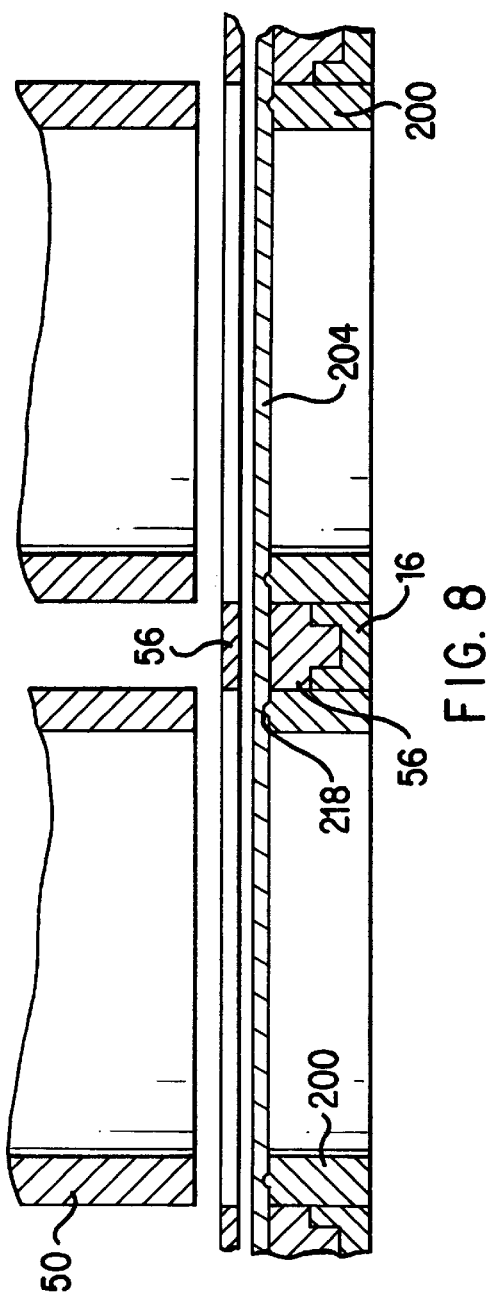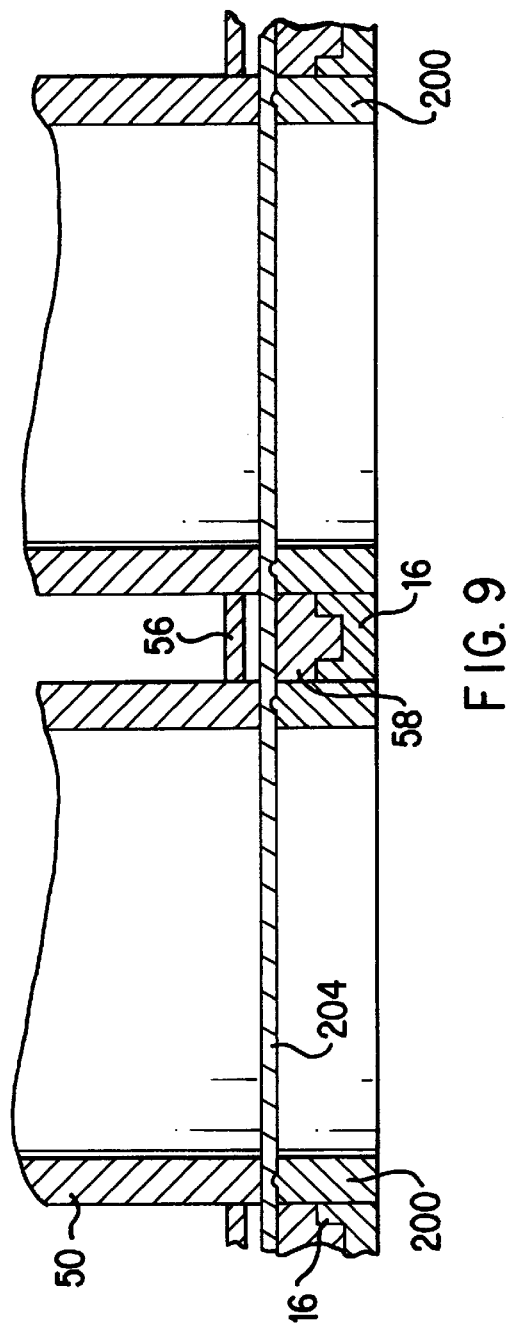

APPARATUS FOR MANUFACTURING ELASTOMERIC ARTICLES

This application claims the benefit of U.S. Provisional Application No. 60/021,236, filed Jul. 3, 1996.

BACKGROUND OF THE INVENTION

The present invention relates generally to a method and system for manufacturing elastomeric articles and more specifically to a method and system for manufacturing a device having a plurality of elastomeric portions, one of which is a relatively thin nonplanar portion and the other of which is a relatively thick portion, such as the devices of the types described in U.S. Pat. No. 5,295,984 for collecting vaginal discharge and/or vaginal delivery of substances such as medication, the entire disclosure of which is incorporated herein by reference.

The system may be used, for example, to produce a particular product whose relatively thick portion may be an elastomeric rim and whose relatively thin portion may be a nonplanar thin elastomeric reservoir. In manufacturing methods of the prior art, devices of this type may be injection molded in one piece. For some devices, however, injection molding is inappropriate because the reservoir component must be a very thin film. In order to achieve this thinness, the reservoir may be vacuum-formed from a sheet of elastomeric material. A common method of producing a device whose reservoir is a very thin film is simply to attach a pre-formed reservoir to a separately formed rim. However, the pre-formed reservoir is difficult to manage because the very thin elastomeric film is fragile, sticks to itself and fails to retain its shape after it has been vacuum-formed.

SUMMARY OF THE INVENTION

In one aspect of the invention, a plurality of first elastomeric portions is heat sealed to a second elastomeric portion having a planar form to create intermediate components that are subsequently placed in a vacuum mold in which the planar second elastomeric portion is formed to create a nonplanar thin portion.

In one application of the present invention, a sheet of elastomeric film is heat sealed to a batch of elastomeric rims to create drumheads that are subsequently placed in a vacuum mold in which the film portion is vacuum formed from the drumheads to form reservoirs.

It is an object of the present invention to provide a method of manufacturing a device having an elastomeric rim and a thin, flexible film reservoir attached to the rim.

It is a further object of the present invention to provide a method of manufacturing a vaginal device.

It is another object of the present invention to provide a method of manufacturing a device that is capable of delivering substances or other agents within the vagina.

It is a further object of the present invention to provide a method of manufacturing a vaginal discharge collector.

It is another object of the present invention to provide a method of mass producing a device having an elastomeric rim and a thin, vacuum-formed, film reservoir attached to the rim.

It is still a further object of the present invention to provide a method of manufacturing a device having an elastomeric rim and a thin, vacuum-formed, film reservoir attached to the rim in which a film is first heat sealed to the rim before the vacuum-forming occurs.

It is another object of the present invention to provide a method of manufacturing a device having an elastomeric rim and a thin, vacuum-formed, film reservoir attached to the rim that monitors whether an appropriate vacuum was formed during the vacuum-forming step and applies this information to separate rejected devices from acceptable ones.

It is an object of the present invention to provide a method for orienting the rims from the molding process such that each molded rim is identically positioned prior to the heat sealing and vacuum molding processes.

It is another object of the present invention to provide a method for automatically testing the devices to determine the presence of manufacturing or material defects within the finished device.

Other objects and advantages of the present invention will become apparent from the following detailed description and drawings which illustrate preferred embodiments of the present invention.

BRIEF DESCRIPTION OF THE DRAWINGS

FIG. 8 is a cross-sectional view taken along section line VIII—VIII of FIG. 7.

FIG. 9 is a view like FIG. 8 showing the heat seal tools welding the film to the rims.

DETAILED DESCRIPTION OF PREFERRED EMBODIMENTS

Figure 14:
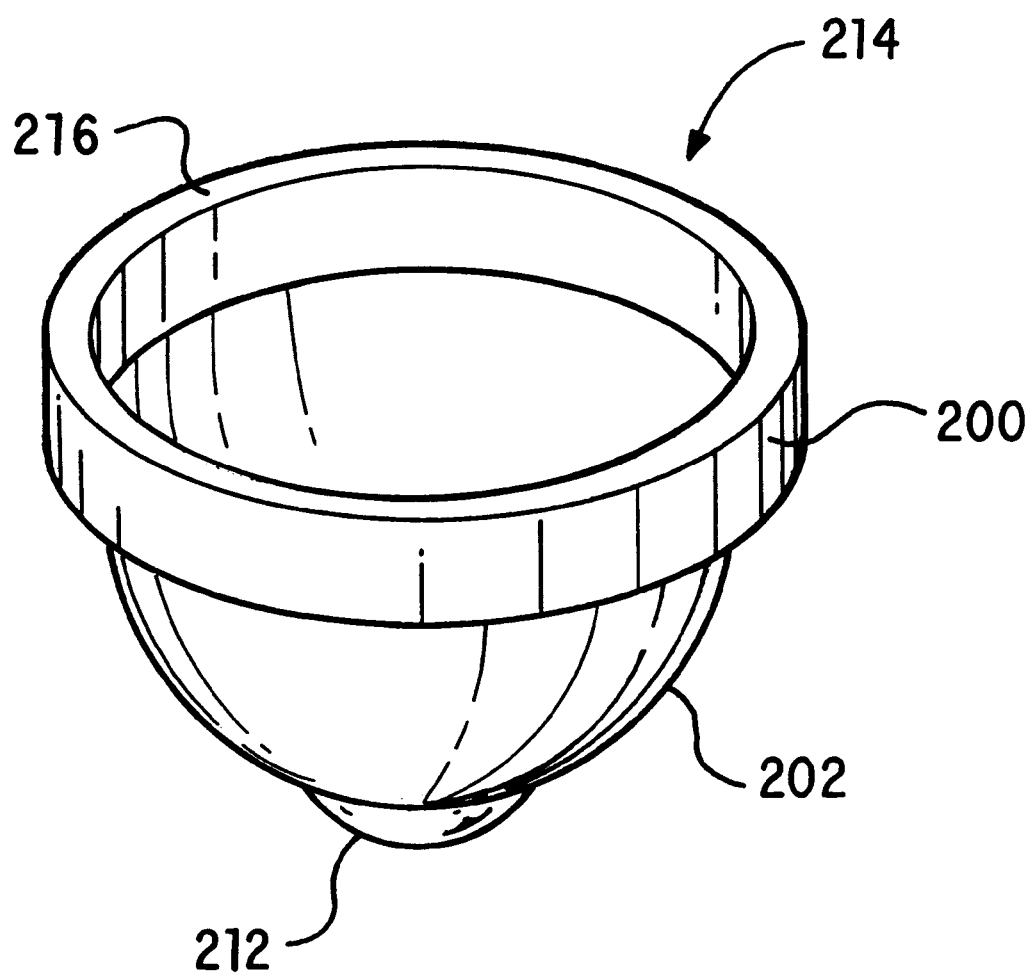
FIG. 14 is a perspective view of a device produced by the system of FIG. 1.

The method of manufacturing a device 214 (see FIG. 14) having an elastomeric rim 200 and a thin, vacuum-formed, film reservoir 202 attached to the rim 200 will now be described. The embodiment shown in the figures is especially adaptable for menstrual fluid collection. For other types of applications, it may be desirable to use appropriate materials and appropriately shaped vacuum forming apparatus so as to shape the devices to desirable forms, such as, for example those described in U.S. Pat. No. 5,295,984, depending upon the desired application, such as substance delivery.

The rim 200 is injection molded in a sixteen cavity injection mold with a hot runner system and small heated gates that leave vestiges 218 (see FIGS. 8 and 9) formed on one side of the rim 200, which give the rim 200 an orientation. The molding operation may leave between 2 and 8 gate vestiges on the molded rim 200 (2 gate vestiges being shown in FIGS. 8 and 9). The reservoir 202 is made from a sheet of elastomeric film 204. The film 204 is manufactured by a flat die processor and delivered to the manufacturing facility of the present invention in rolls 42.

Figure 1:
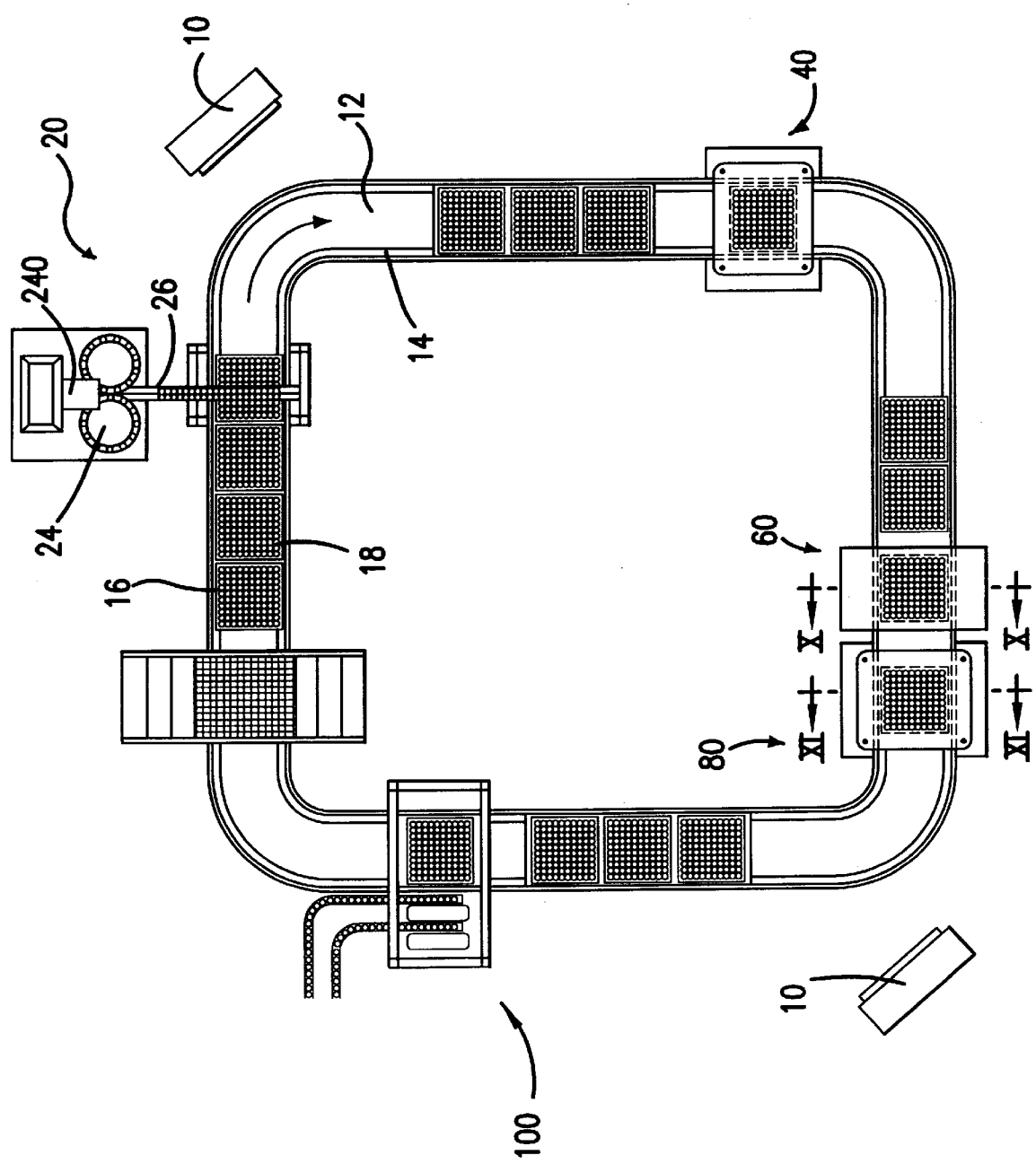
FIG. 1 is a plan view of a preferred embodiment of a system for manufacturing a device having an elastomeric rim and a thin, vacuum-formed, film reservoir attached to the rim according to the present invention.
Figure 2:
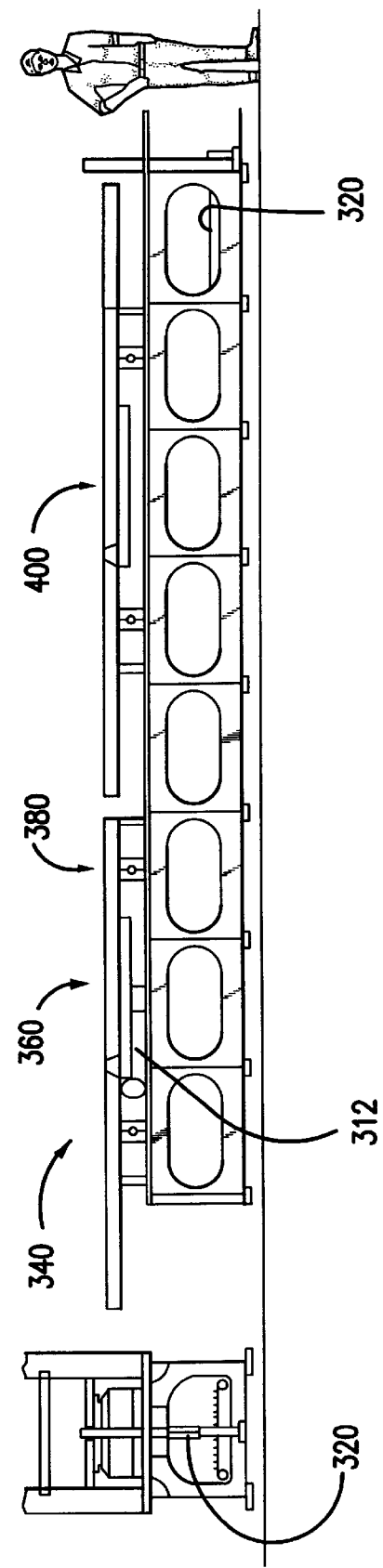
FIG. 2 is an elevation view of a second preferred embodiment of a system for manufacturing a device having an elastomeric rim and a thin, vacuum-formed, film reservoir attached to the rim according to the present invention.

Refer now to FIGS. 1 and 2, there being shown a preferred embodiment of a manufacturing system according to the present invention. The manufacturing system of FIG. 1 includes five stations: the load station 20, the heat seal station 40, the pre-heat station 60, the vacuum forming station 80 and the unload station 100. The manufacturing system is controlled by two programmable logic controllers (PLC) 10 which sequence the actions of the equipment. These activities may be automated or actuated at various points by operator controls.

Figure 20:
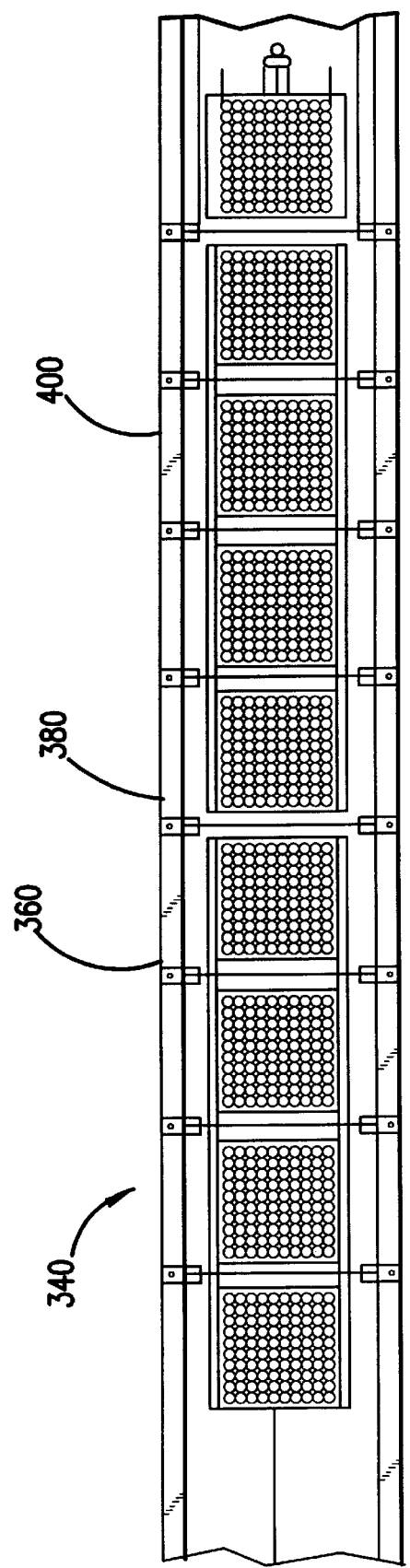
FIG. 20 is a top view of a second embodiment of a system for manufacturing a device having an elastomeric rim and a thin, vacuum-formed, film reservoir attached to the rim according to the present invention.

A carrier plate 16 containing the devices travels through each station. FIG. 1 shows the stations being arranged in a carousel connected by a conveyor 12 having a pair of chain assemblies 14 that carry the carrier plate 16. FIG. 2 shows the station being arranged in a line in which a walking beam system 317 carries the carrier plate 16 to each station: the heat seal station 340, the pre-heat station 360, the vacuum forming station 380, and the unload station 400. Elevators 320 are located at each ends of the line of FIG. 2, which raise and lower the carrier plate 16. The elevators 320 enable some of the stations to be stacked above others, which conserves floor space in the factory. FIG. 20 shows a top view of the station of FIG. 2.

Figure 21:
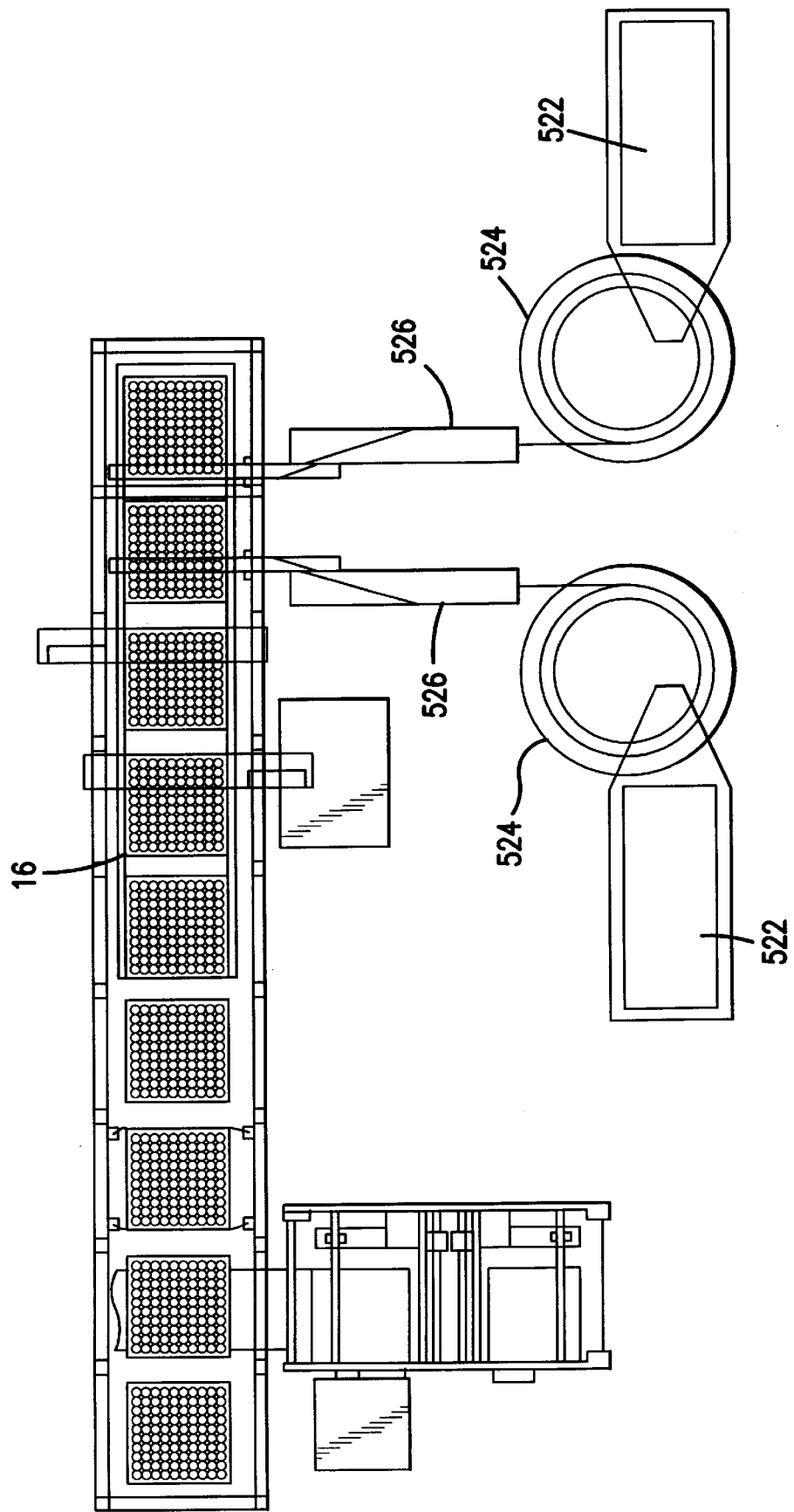
FIG. 21 is a plan view of another embodiment of a system for manufacturing a device having an elastomeric rim and a thin, vacuum-formed, film reservoir attached to the rim according to the present invention.

FIG. 21 shows a plan view of another embodiment of the invention where the rims 200 are fed onto the carrier plates 16 by loading the rims 200 onto two separate carrier plates 16 at one time before the carrier plate 16 proceeds to each station. The rims 200 are poured into a trough shaped pre-feeder 522 before traveling to a pair of centrifugal feeders 524. The centrifugal feeders 524 discharge the rims 200 into a pair of lanes 526 in a flat orientation for insertion into the carrier plates 16. The assembly may include a device (not shown) for inspecting the rims 200 prior to insertion into the carrier plates 16 to determine the roundness, flatness and orientation of the rims 200.

The carrier plate 16 may be conveyed to each of the manufacturing stations by the conveying arrangement of either FIG. 1 or FIG. 2, as well as by others known in the art.

Figure 3:
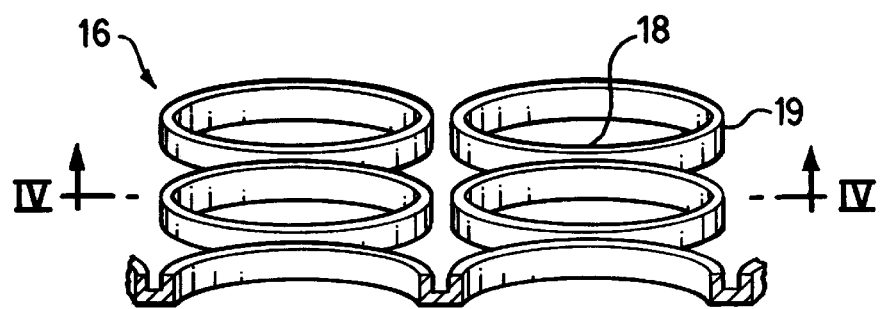
FIG. 3 is a perspective view of part of a carrier plate used in the system of FIG. 1.
Figure 4:
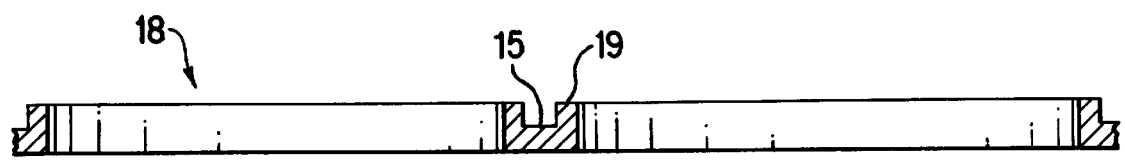
FIG. 4 is a cross-sectional view taken along section line IV—IV of FIG. 3.

FIG. 1 shows that the carrier plate 16 of the present invention is square, and sized to accommodate a plurality of devices. In a preferred embodiment, the carrier plate 16 is approximately 36 inches by 36 inches and approximately 0.3125 inches thick. One hundred holes 18 are formed in the carrier plate in ten rows of ten. The diameter of the holes 18 is designed to produce a friction fit between the rims 200 and the holes 18 when the rims 200 are inserted into the holes 18. As seen in FIGS. 3 and 4, the holes 18 extend through the entire carrier plate 16. The carrier plate 16 includes annular ridges 19 around each hole 18. A recess 15 is defined between the annular ridges 19. The depth of the recess and the height of the ridges are dimensioned such that a lower stripper plate 58 fits within the recess and the ridges 19 lend support to the rims 200 during the heat sealing process.

The rims 200 are poured into a trough-shaped pre-feeder 22 at the load station 20. The rims 200 then travel to a pair of centrifugal feeders 24 which discharge the rims 200 into a pair of lanes 26 in a flat orientation. The assembly may include a module 240 (shown in FIGS. 15–18) that inspects the rims 200 and diverts them such that they fall with the side including the vestige oriented upwards. The lanes 26 carry the rims 200 over to the carrier plate 16 which has been placed in position.

Figure 15A:
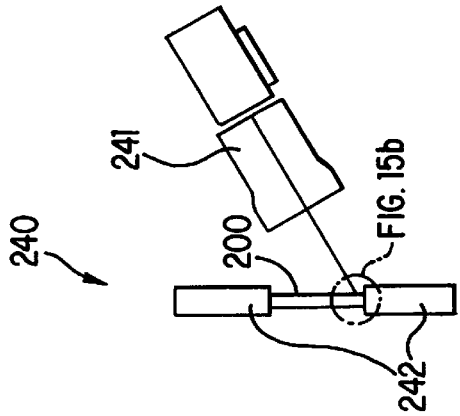
FIG. 15 is a perspective view of a preferred system for determining the orientation of the rims prior to being inserted into the carriers.
Figure 15B:
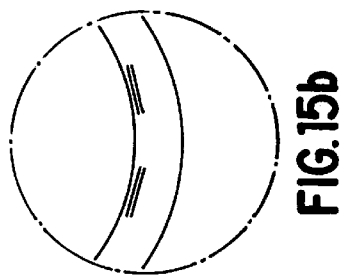
Figure 18:
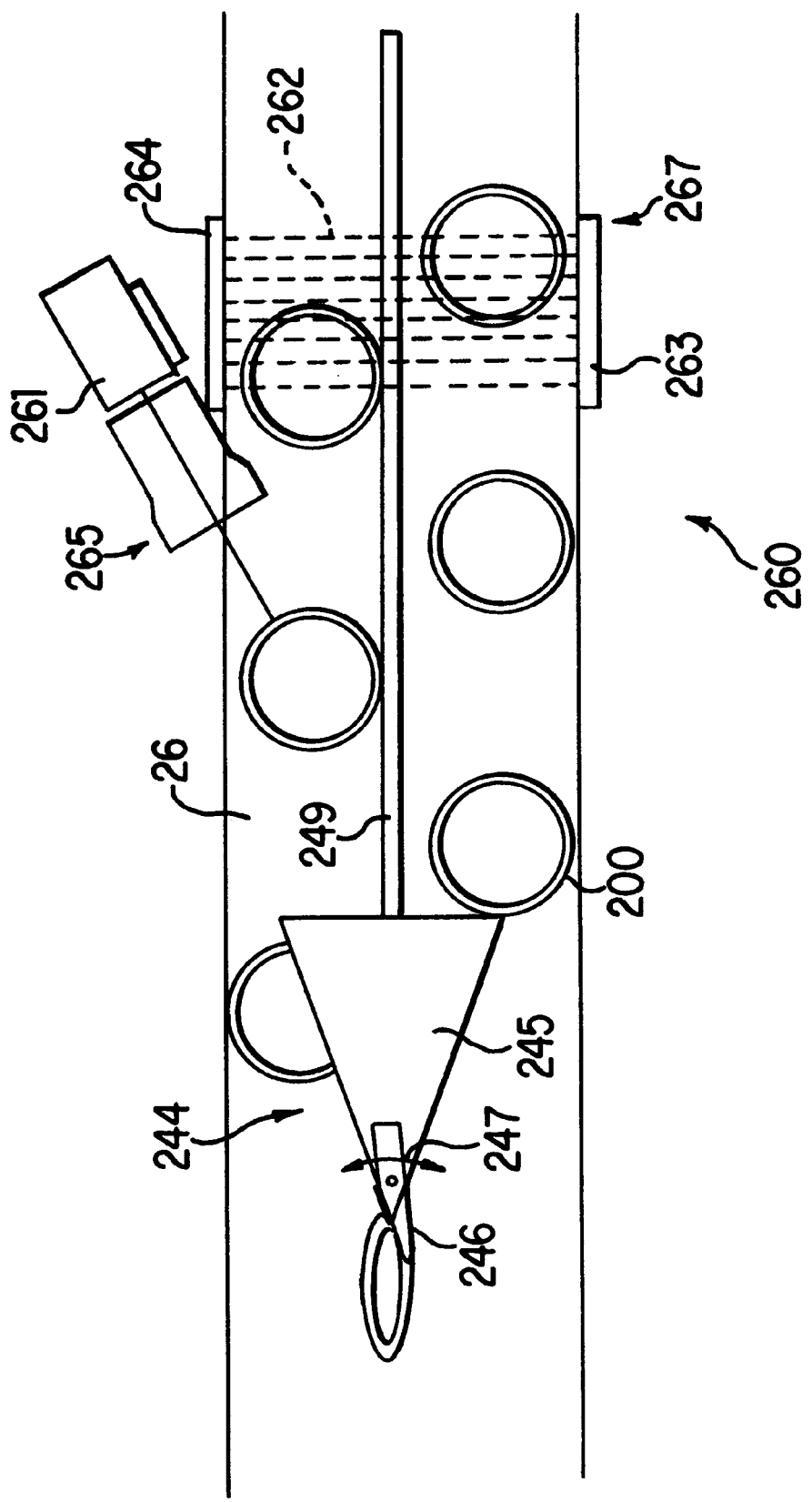
FIG. 18 is top view of a preferred system for determining the roundness and flatness of the rims prior to being inserted into the carriers.

Refer now to FIG. 15. This figure shows a preferred embodiment where the assembly includes a module 240 that inspects the rims 200 and diverts them such that they fall with the vestige 218 oriented upwards. The rim 200 is molded with a series of protrusions 222 on the inside surface of the rim 200. The protrusions 222 are not in the center of the inside surface, but are offset and aligned closer to one edge of the inside of the rim 200. In the illustrated embodiment, the protrusions 222 are located opposite the vestiges 218. The protrusions 222 are sized and spaced to be sufficiently distinct to be detected by a vision detection system as discussed below. In the illustrated embodiment, the protrusions 222 are spaced around the inside circumference of the rim 200 and are about 0.25 inches in length, about 0.0625 inches wide and have a height of from about 0.005 inches to about 0.010 inches. The rim 200 may include as many protrusions 222 as are required for efficient operation. Preferably, the rim 200 includes about 10 protrusions 222 located along the interior circumference of the rim 200.

The protrusions 222 serve at lease two different purposes. The protrusions 222 facilitate the extraction of the molded rim 200 from the cavity in the molding operation to the core side to enhance efficient cycling of the molding operation of the rim 200. The offset protrusions 222 are also recognizable by the video camera 241 and serve to differentiate one edge of the rim 200 from the other. Only one edge of the rim 200 has vestiges 218 and through this process all of the rims 200 will be oriented with the vestiges 218 facing the same direction. Detecting the protrusions 222 on the inside circumference of the rim 200 is important so that the rim 200 may be oriented such that the film 204 is welded onto the rim 200 where the vestiges 218 are present. This ensures that the vestiges 218 are not left exposed, which in some cases, if the vestiges 218 are present, may irritate the user.

To ensure that the rims 200 are properly oriented, reference is made to FIG. 15. The rims 200 are stood up on their edge in the elevating conveyors 242 and moved toward the camera 241. As they move toward the camera 241, the rims 200 are compressed to produce a flattened segment 243 which in the illustrated embodiment is about one and one-half inches long allowing the camera 241 to view the protrusions 222 on the interior circumference of the rims 200. The camera 241 recognizes the position of the protrusions 222 on the inside circumference of the rim 200 and signals an orienting device 244 farther down the track which orients the rims 200 with the vestiges 218 pointed upward. The camera 241 preferably uses Acuyty™ software from IVS Express Vision to recognize the presence of the protrusions 222, and therefore the orientation of the rim 200 and to contact the rotating vane 246 to orient the rims before placing them in the carrier plate 16.

Figure 17:
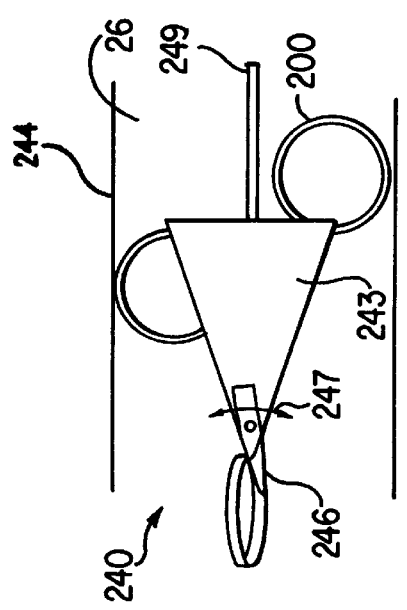
FIG. 17 is a top view of the system of FIG. 15.
Figure 16:
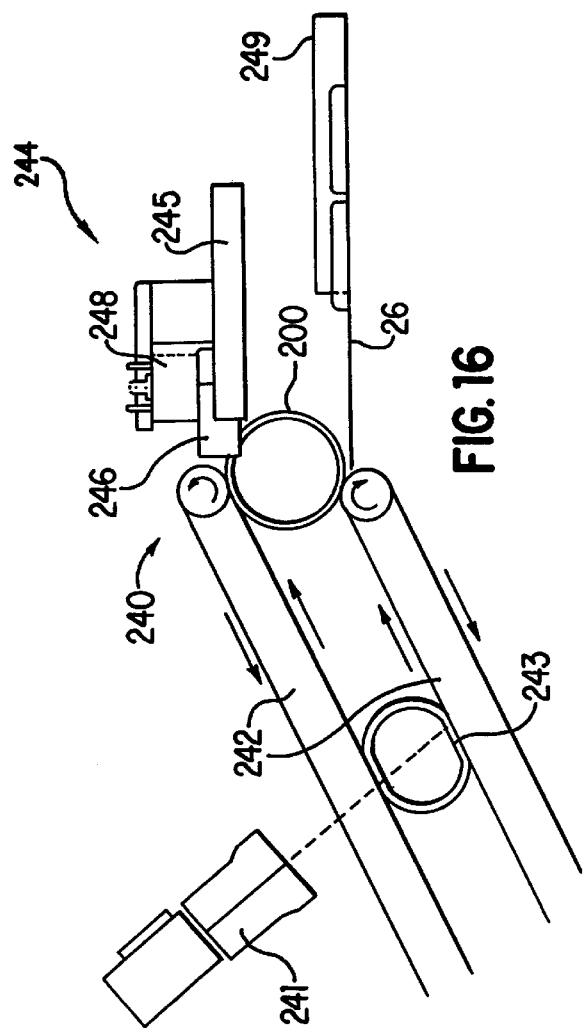
FIG. 16 is an elevation view of the system of FIG. 15.

Further reference is made to FIGS. 16 and 17. These figures show the rim 200 moving through the elevating conveyors 242 to a preferred orienting device 244 for orientating the rims 200. The orienting device 244 preferably comprises a stationary vane 245 and a rotating vane 246 which is in contact with a rotary solenoid 248. The rotary solenoid 248 senses the signal from the camera 241 and signals the rotating vane 246 to tip the rim 200 in a direction 247 so that the vestiges 218 are facing upward on the discharge conveyor 26. The discharge conveyor 26 may include a wall 249 that maintains the rims 200 oriented in two rows for insertion in the carrier plate 16.

In a preferred embodiment, the module 240 includes an additional rim inspection device 260 (FIG. 18) to determine whether the rim 200 is within predetermined tolerances for both roundness and flatness. The rim inspection device 260 is preferably located after the rim orienting device 244. The rim inspection device 260 has a machine vision system 265 which views the rim 200 as the rim 200 moves along a conveyor 26 and a flatness detection device 267. Preferably, the rims 200 pass the rim inspection device 260 at a rate of about 300 to 400 per minute.

The rim inspection device 260 inspects the rims 200 for both roundness and flatness. To inspect the rims 200 for roundness, each rim 200 is inspected by the machine vision system 265. The machine vision system 265 includes a camera 261 which takes an electronic image of the rim 200. The machine vision system 265 evaluates the rim 200 at several points to determine whether the rim 200 meets predetermined physical characteristics so that the rim 200 has sufficient roundness for use in the device 214 by comparing the electronic image obtained from the rim 200 to a predetermined range of acceptable images. If the rim 200 is determined to be insufficiently round for use in the device 214, the rim 200 is discarded by an actuated air jet (not shown). The machine vision system 265 may use the Acuyty™ Intelligent Vision software as described above.

The flatness detection device 267 includes a plurality of photocells 263 which scan across the top of the rim 200 as they move along the conveyor 26. The photocell beam 262 is set at a predetermined height above the conveyor 26. The photocells 263 scan across the conveyor 26 to a photocell receptor 264. If a photocell beam 262 is broken, the rim inspection system 260 discards the rim 200 through the use of an actuated air jet (not shown).

Figure 5:
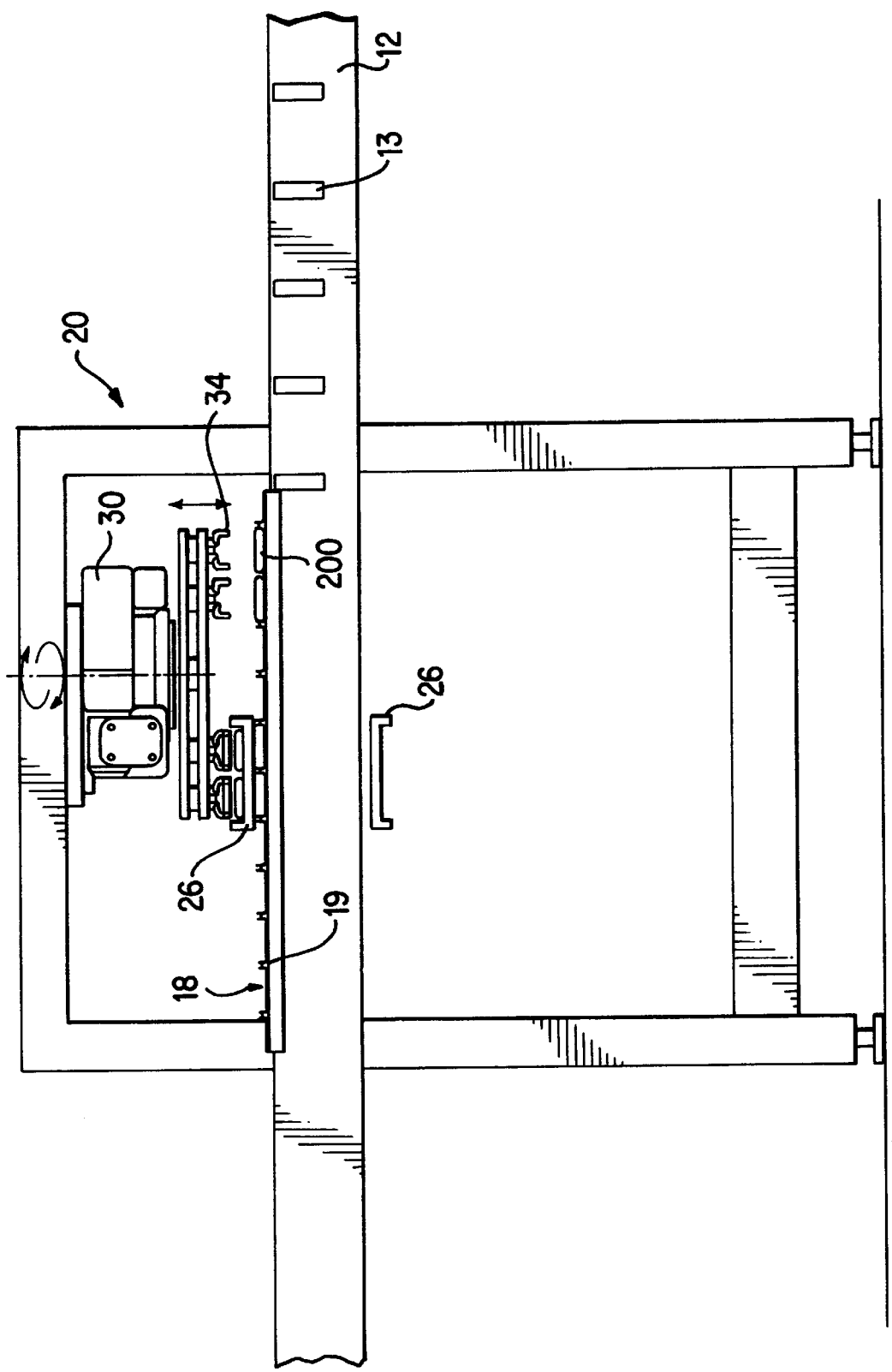
FIG. 5 is a perspective view of the load station of the system of FIG. 1.

At this point the rims 200 are singulated, or removed individually, either by a robotic arm 30, as seen in FIG. 5, or by some other escapement device. The rims 200 are then inserted into the holes 18 of the carrier plate 16. A robotic hand 34 may be used to take the rims 200 from the lanes 26 and insert them into the carrier plate 16. When a robotic arm 30 is used with a conveyor 12, stops 13 are formed on the conveyor 12 that index the carrier plate 16 two rows at a time so that the robotic arm 30 may insert two rows of rims 200 into the carrier plate 16 before the carrier plate 16 is moved to the next stop 13. In the alternative, rather than using a robotic arm arrangement, the rims 200 could be scooped from a singulated row and put into a coin changer type escapement which would manually place each rim 200 into a funnel that is aligned with the holes 18 in the carrier plate 16 and insertion rams may travel through the insertion chute to push the rims 200 into the holes 18.

Figure 6:
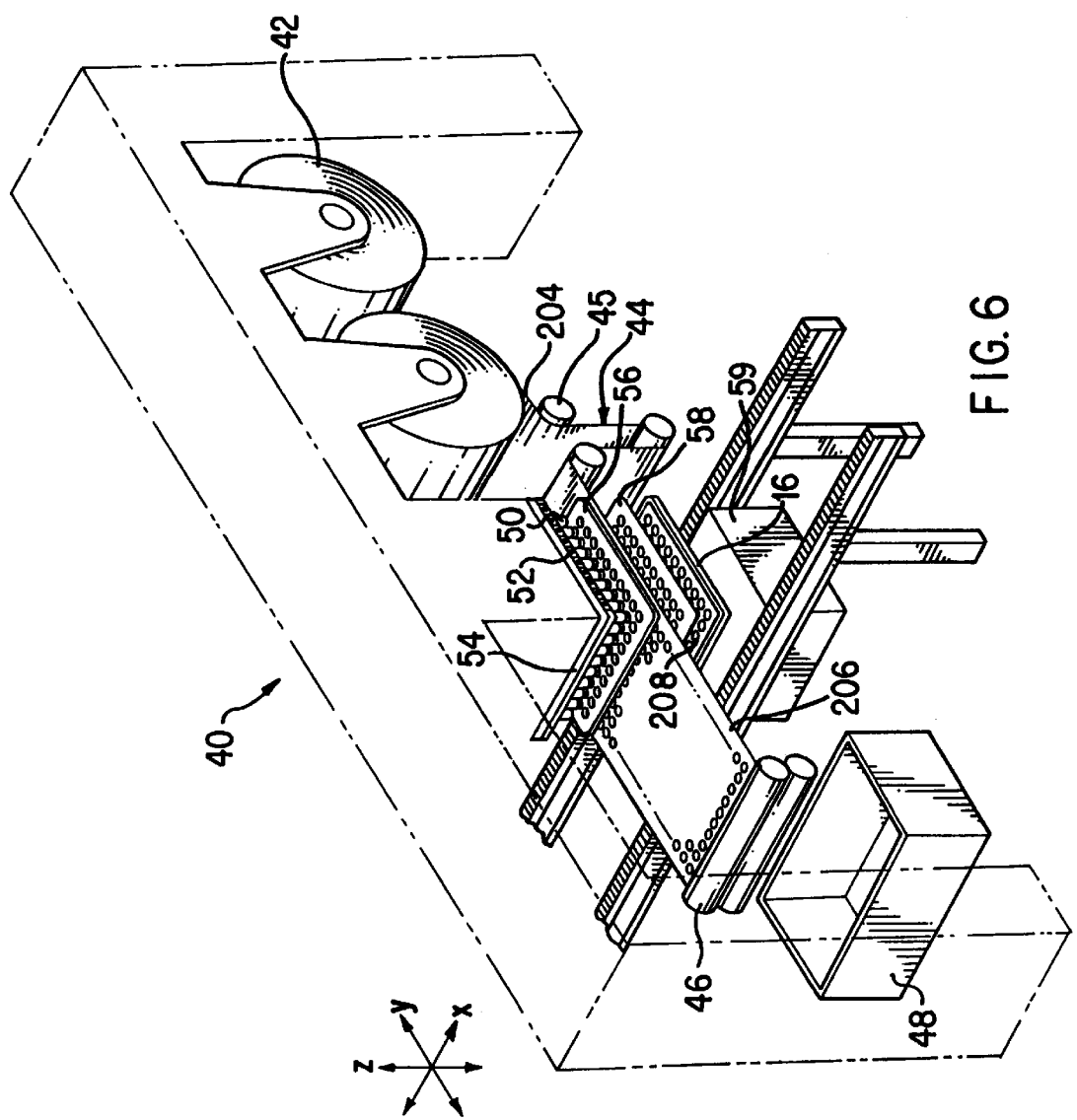
FIG. 6 is a perspective view of the heat seal station of the system of FIG. 1.

In either case, the rims 200 are held in the carrier plate 16 by a friction fit, which prevents the rims 200 from falling out of the carrier plate 16 during the balance of the manufacturing process until the devices are formed and unloaded from the carrier plate 16. The friction fit enables the rims 200 to be loaded into the carrier plate 16 from the top and unloaded through the bottom because it eliminates the need for a ledge formed within the hole 18 that could support the rims 200. Because the holes 18 do not contain a ledge or any other protrusion, the rims 200 may be pushed all the way through the holes 18. When the rims 200 are within the carrier plate 16, their motion in the X-Y direction (see FIG. 6) is completely restricted.

In the embodiment shown, after one hundred rims 200 are inserted into the carrier plate 16 so that all of the holes 18 contain a rim 200, the plate 16 is conveyed to the heat seal station 40. Refer now to FIGS. 6–9. The heat seal station 40 includes a support table 59, which supports the carrier plate 16, a feeder mechanism 46 which advances the film 204 though the heat seal station 40, and two film rolls 42. The film is thin, approximately 0.011 inches, and is threaded through several cylinders 45 to create a slack loop 44. Then, the film 204 is threaded between an upper stripper plate 56 and a lower stripper plate 58, which are spaced apart a sufficient distance to allow the film 204 to be threaded between them. In a preferred embodiment, this distance is about 0.25 inches. The film 204 is finally grasped by the feeder mechanism 46. The film 204 that remains after the heat seal process, i.e., the scrim 206, is discarded into a scrap box 48.

When the carrier plate 16 is positioned on the support table 59, the feeder mechanism 46 advances the film 204 such that a fresh portion of the film 204 is located above the carrier plate 16. A lower stripper plate 58, having holes formed in it that are aligned with the position of the rims 200 within the annular ridges 19, is then lowered to rest within the recess 15 of the carrier plate 16, as seen in FIG. 8. Gravit, pulls the film 204 downward so that the film 204 touches the lower stripper plate 58 and contacts the top of the rims 200. The film 204 lies on the tops of the rims 200 such that it is essentially flat. An upper stripper plate 56 assists in keeping the film 204 in position.

An array of heat seal tools 50, also referred to as weld tools, is then lowered though the upper stripper plate 56 to touch the film 204, as seen in FIG. 9. Each heat seal tool 50 is dimensioned to position the pressure point of the tool 50 precisely on the rim shoulder 216 where there is relief for the edge of the tool 50 such that no vestige is formed by the weld. The flexibility and resiliency of the elastomeric rim 200 allows for wider tolerances in the alignment of the rims 200 with the weld tools 50. The force from the heat seal tool 50 transfers through the carrier plate 16 to the support table 59, which supports the load. In a preferred embodiment, the carrier plate 16 does not support the load produced by the heat seal tool 50.

Figure 7:
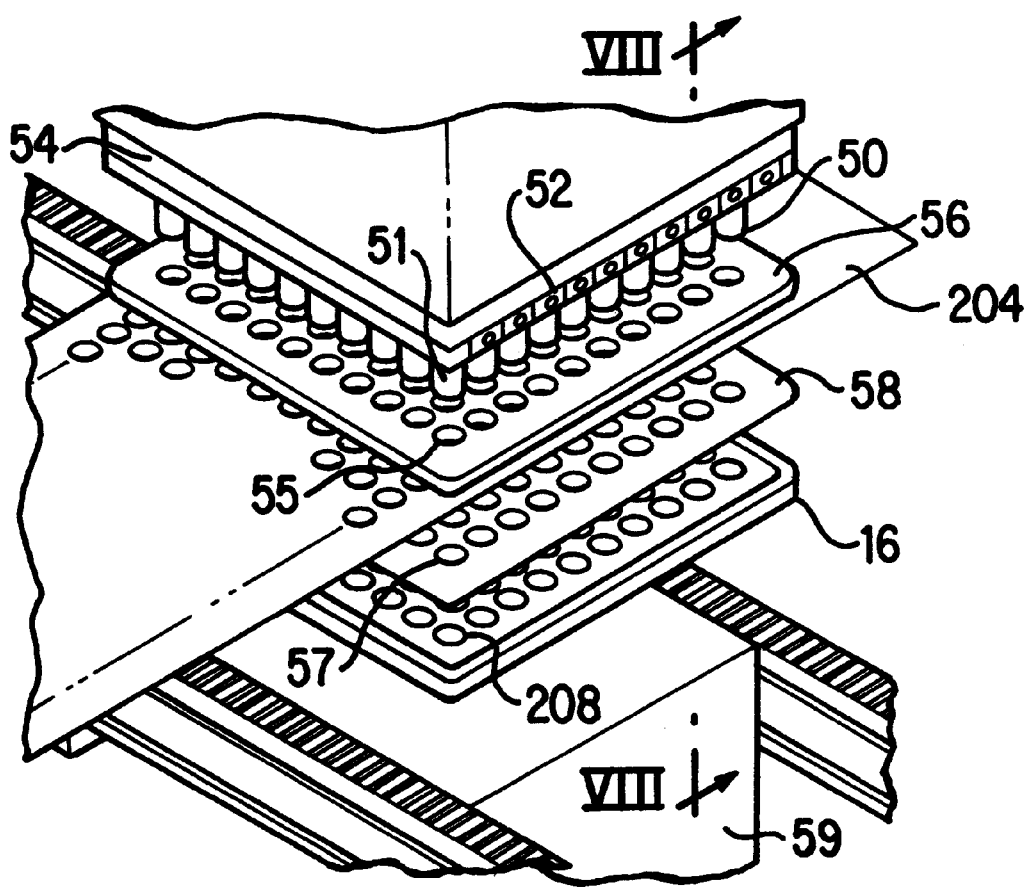
FIG. 7 is a blown-up perspective view of the heat seal station of FIG. 6.

As seen in FIG. 7, the heat seal tool 50 is heated by a cal rod style heater 52 with five heat seal tools 50 per bar. The heated bars are mounted to a water-cooler platen 54. The heat seal tools 50 are maintained at approximately 360 degrees F. When the heat seal tools 50 are lowered to extend through both the upper and lower stripper plates 56, 58, they touch the film 204 (FIG. 9) for about four seconds to weld the film 204 to the rims 200. The welded combination of a rim 200 and the film 204 within the rim 200 is referred to as a drumhead 208. When the vestige 218 formed on the rim 200 is oriented upward, as seen in FIGS. 8 and 9, the film 204 is sealed over it so that the vestige 218 is not visible and does not protrude from the rim 200 of the device 214 to irritate the vaginal canal. Thus, welding the film 204 to the vestige 218 side of the rim 200 produces a more comfortable, and thus, superior device 214.

After the weld is formed, the heat seal tools 50 remain in position while the stripper plates 56, 58 are lifted together such that the film 204 not part of the drumheads 208 is severed from the rims 200. This severing occurs because the film 204 around each heat seal tool 50 becomes molten as the tool 50 welds the film directly under the tool 50 to the rims 200. In addition, the edges of the heat seal tools 50 are sharpened slightly. The heat seal tools 50 are then lifted up to retract the tools 50 through the stripper plates 56, 58. The upper stripper plate 56 removes any remaining film 204 from the heat seal tools 50. The carrier plate 16 containing the newly formed drumheads 208 is then conveyed to the pre-heat station 60.

Figure 10:
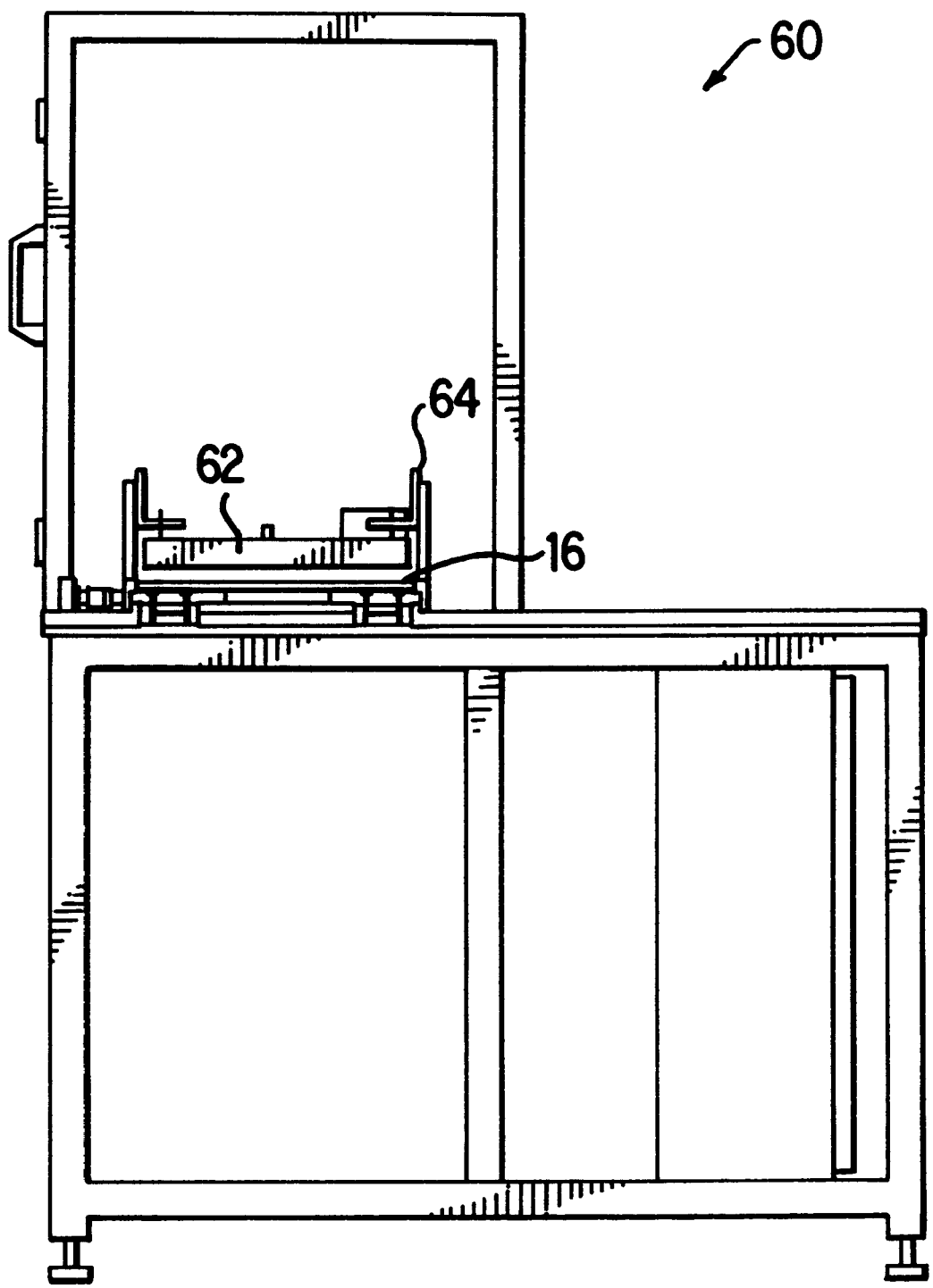
FIG. 10 is an elevation cross-sectional view taken along section line X—X of FIG. 1 of the pre-heat station of the system of FIG. 1.

Refer now to FIG. 10 showing the pre-heating station 60. A pre-heating station is needed in order to raise the temperature of the drumheads 208 to the temperature necessary for effective vacuum forming. In a preferred embodiment, the drumheads should be about 250 degrees F. when they arrive at the vacuum forming station. The film 204 is known to cool very rapidly after removal from a heat source. As a result, the pre-heat station must be close to the vacuum forming station in order to minimize the transfer time between these stations. Low transfer time enables the pre-heating station to be maintained at a lower temperature, reduces the amount of time required in the pre-heating station and thus, the over all time of the manufacturing process, reduces the capacity of heater needed, and produces less heat waste.

The pre-heat station 60 includes an infrared heater 62 which includes several heating elements encased by ceramic insulating material. The heating elements are spaced closely together to prevent uneven heating. A quartz radiating panel extends across the heating elements parallel to the carrier plate 16. This panel diffuses the heat produced by the heating elements and reduces the chance of uneven heating. Uneven heating may hinder the formation of the reservoir during the vacuum forming step 80 because the temperature of the drumheads 208 should be uniform in order for the film 204 to be formed properly. The temperature of the radiating panel is monitored with a thermocouple and is maintained in a preferred embodiment at about 1450 degrees F. The temperature of the drumheads 208 is regulated by the amount of time spent in the pre-heat station 60 and the distance between the radiating panel and the drumheads 208. Heater mounts 64 are used to adjust the height of the radiating panel.

The carrier plate 16 remains in the pre-heat station for approximately eight seconds. When the drumheads leave the pre-heat station 60, they should be warm enough to be able to enter the vacuum forming station 80 at a temperature appropriate for proper vacuum formation. In a preferred embodiment, this temperature is approximately 270 degrees F. The carrier plate 16 is then conveyed to the vacuum forming station 80 rapidly in order to reduce the amount of heat loss.

The pre-heat station 60 could be eliminated if a heated surface were placed inside the heat seal tool 50 which would touch both the film 204 and raise its temperature to the proper thermoforming temperature.

Figure 12:
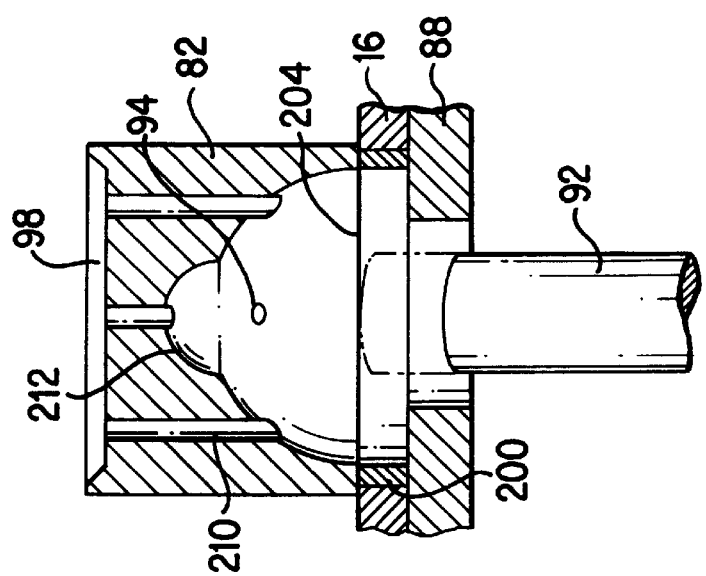
FIG. 12 is a cross-sectional view of the vacuum cavity of the vacuum forming station of FIG. 11.
Figure 11:
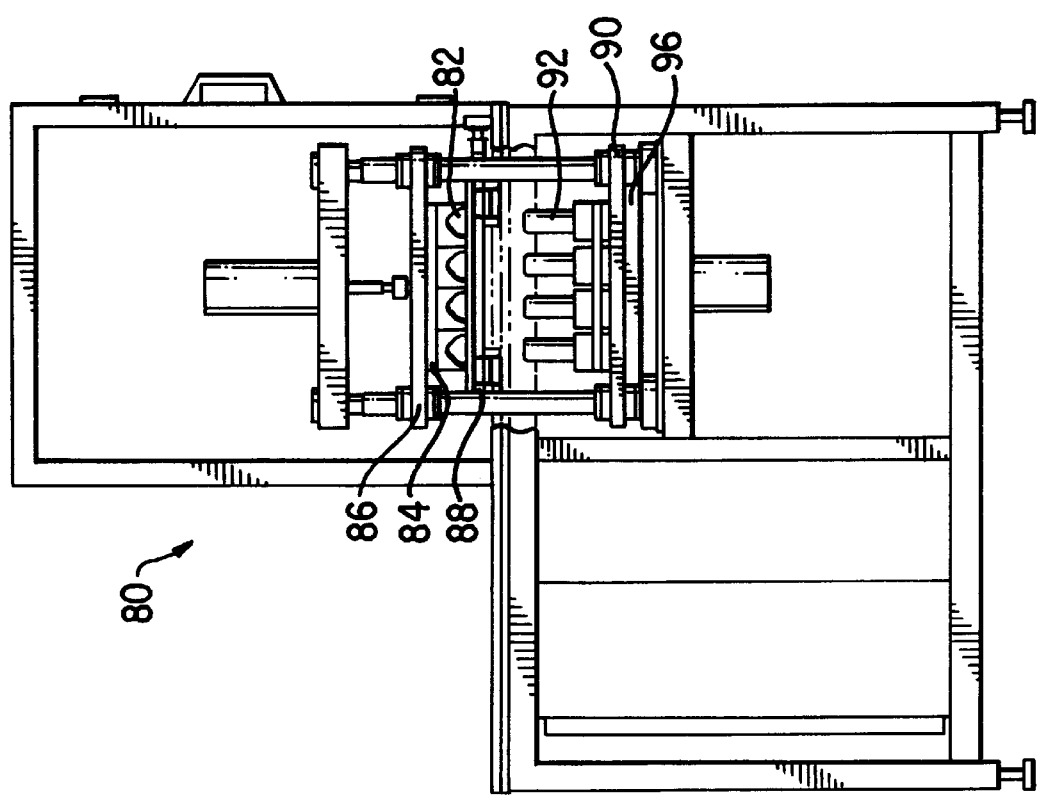
FIG. 11 is an elevation cross-sectional view taken along section line XI—XI of FIG. 1 of the vacuum forming station of the system of FIG. 1.

Refer now to FIGS. 11 and 12. The vacuum form station 80 includes one hundred vacuum form cavities 82 mounted to a stationary upper platen 84 in an arrangement of ten rows of ten to correspond to the hundred drumheads 208. Each vacuum cavity 82 has vacuum holes 94 through which air is drawn to create a vacuum. In a preferred embodiment, each cavity 82 has five 0.015 inch diameter holes 94. The holes 94 join together in an internal plenum 98 within the vacuum cavity 82 from which a single vacuum line (not shown) runs out of the individual cavity 82. The vacuum line includes a sensor (not shown) that monitors whether a proper vacuum has been drawn within the individual cavity 82 and relays this information to the PLC's that control the manufacturing process. The vacuum cavities 82 are maintained at a temperature that reduces the likelihood of freeze-off and optimizes the effectiveness of the vacuum forming process. In a preferred embodiment, this temperature is approximately 150 degrees F. A water chiller or heater 86 is provided to chill or heat the vacuum cavities 82 as needed.

The vacuum forming station also includes one hundred mandrels 92 extending from a first lower platen 90. The mandrels 92 are arranged in ten rows of ten and are aligned with the center of the vacuum cavities 82. The mandrels 92 are maintained at approximately 220 degrees F, or between 20 and 30 degrees less than the film 204 of the drumheads 208. A water chiller or heater 96 is provided to chill or heat the mandrels 92 as needed.

The carrier plate 16 is raised by a second lower platen 88 and pressed to the vacuum cavities 82 to create a seal between each rim 200 and each vacuum cavity 82. The rim 200 acts as its own o-ring as a result of the flexibility and resiliency produced by the formulation of the elastomeric material of which the rim 200 is made. The vacuum cavities 82 do nor contact the carrier plate 16. The first lower platen 90 is then raised to bring the mandrels into contact with the film 204 of the drumheads 208 at the center of the rims 200. Since the film 204 temperature is greater than that of the mandrels 92, the mandrels 92 act as heat sinks and cool the film 204 at the centers of the drumheads 208.

A vacuum is introduced into the vacuum cavities 82 about one to about one and one half seconds after the mandrels 92 contact the film 204, as the first lower platen 90 begins to lower. The vacuum extrudes the film 204 into the cavities 82 and forms the reservoirs 202. Because the film 204 at the centers of the drumheads 208 travels the farthest into the cavities 82, it is important to cool this film 204 so that it does not stretch too thinly in reaction to the force produced by the vacuum. Because the center is cooler and does not stretch as much as the warmer portions of the film 204, the sides of the film 204 must stretch more in order for the cavity 82 to be filled by the film 204. Thus, the reservoirs 202 are produced with the proper thickness at their centers. In addition, maintaining the temperature of the vacuum cavity 82 prevents freeze-off and contributes to the accuracy of the thickness of the reservoir. In one application of a preferred embodiment of the vacuum forming station 80, the reservoir's 202 thickness varies from about 0.010–0.011 inches closest to the rim 200, to about 0.004–0.007 inches at the shoulder 210, to about 0.001–0.003 inches at the dimple 212.

After a predetermined time, the vacuum is discontinued and the second lower platen 88 is lowered. The whole vacuum forming operation should take between ten and fifteen seconds. The PLC notes the location of any vacuum cavity 82 that fails to produce a proper vacuum so that the device 214 in that location may be rejected at the unload station 100. The carrier plate 16 is then conveyed to the unload station 100.

As described above the device 214 is vacuum formed. However, the device 214 may be formed by other methods such as, physically forming the device with a mandrel or press type tool and/or creating a pressure differential between a first side of the film and a second side of the film 204. The pressure differential formed between the first and second side of the film 204 may be at any combination of pressures above, below or at atmospheric pressure so long as there is a pressure differential between the first and second sides of the film 204. Further, when the device 214 is formed through a pressure differential, there may be created such a pressure differential so that the device 214 is formed by pushing or pulling the film 204 to form the device 214.

Figure 13:
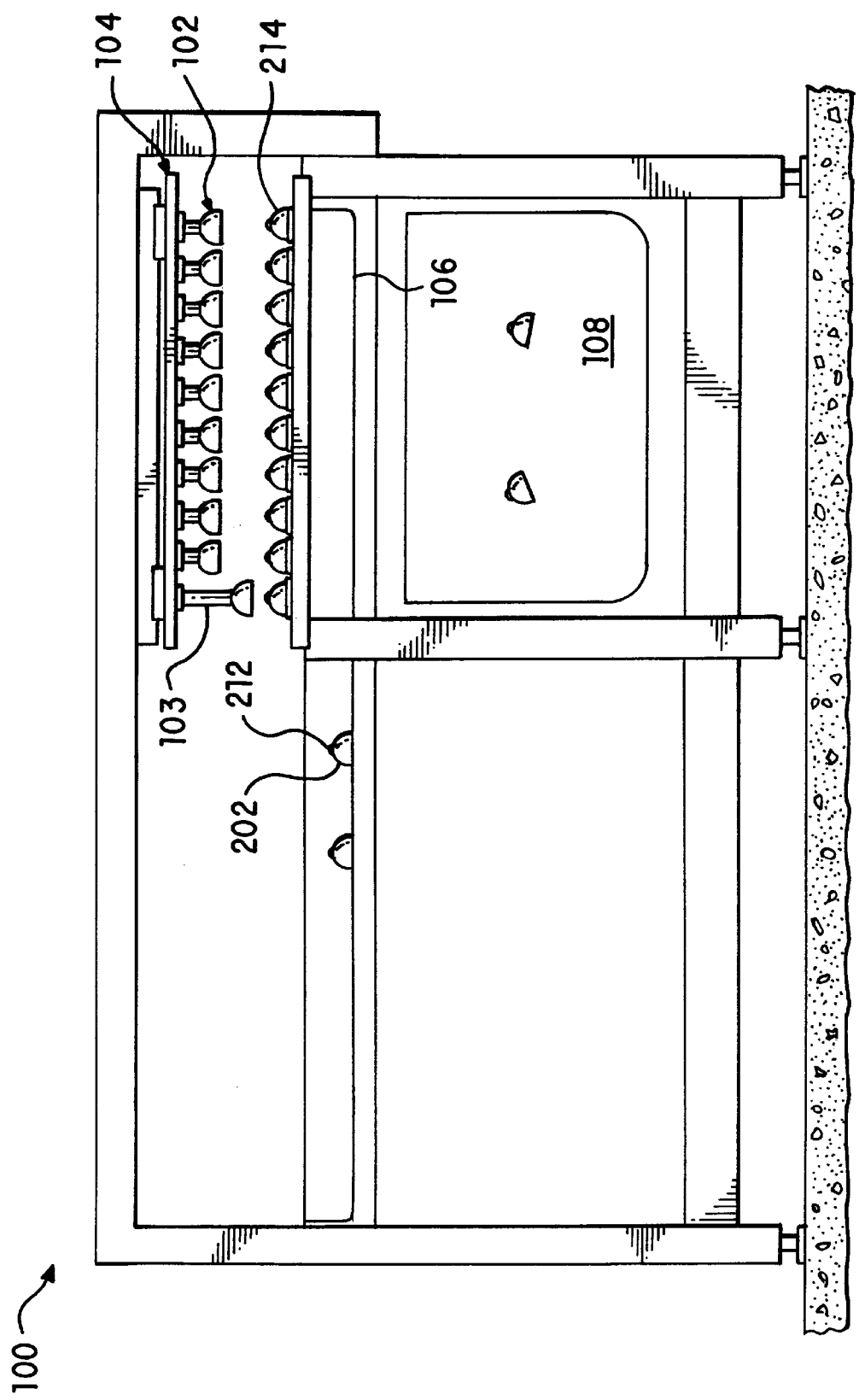
FIG. 13 is an elevation view of the unload station of the system of FIG. 1.

Refer now to FIG. 13. The carrier plate 16 is positioned in the unload station 100. A servo controlled positioner regulates the position of the carrier plate 16 and enables the PLC to determine whether a particular device 214 should be rejected. The unload station 100 includes a first discharge row 104 of rams 102 that are capable of moving vertically individually. The rams 102 are dimensioned to fit the rims 200. The unload station 100 also includes a second discharge row (not shown) of rams (not shown) that move vertically in unison. The rams are dimensioned to fit the rims 200.

The carrier plate is positioned such that one of its ten rows of devices are under the first discharge row 104. The PLC determines which devices 214 are acceptable and actuates the individual rams 102 corresponding to acceptable devices 204. The rams 102 move vertically and push on the rims 200 to eject the acceptable devices 214. The acceptable devices 214 fall onto a conveyor 106 and are carried to the packaging station (not shown). The carrier plate 16 then is positioned such that the first row of ten devices is under the second discharge row (not shown) and a second row of ten devices is positioned under the first discharge row 104. The second discharge row (not shown) moves its rams in unison to eject into a rejection bin 108 the remaining devices, which correspond to rejected devices whose vacuum sensor indicated that a proper vacuum was not maintained. The carrier plate 16 is again advanced until all ten rows of devices have traveled through both the first and second discharge rows. The unloading operation similarly could be programmed such that the rejected devices 214 are pushed out of the carrier plate 16 by the individually movable rams 102 on the first discharge row 104 and the acceptable devices 214 are ejected in unison. In either system, sensors are provided to assure that no devices 214 remain in the carrier plate 16.

Figure 19:
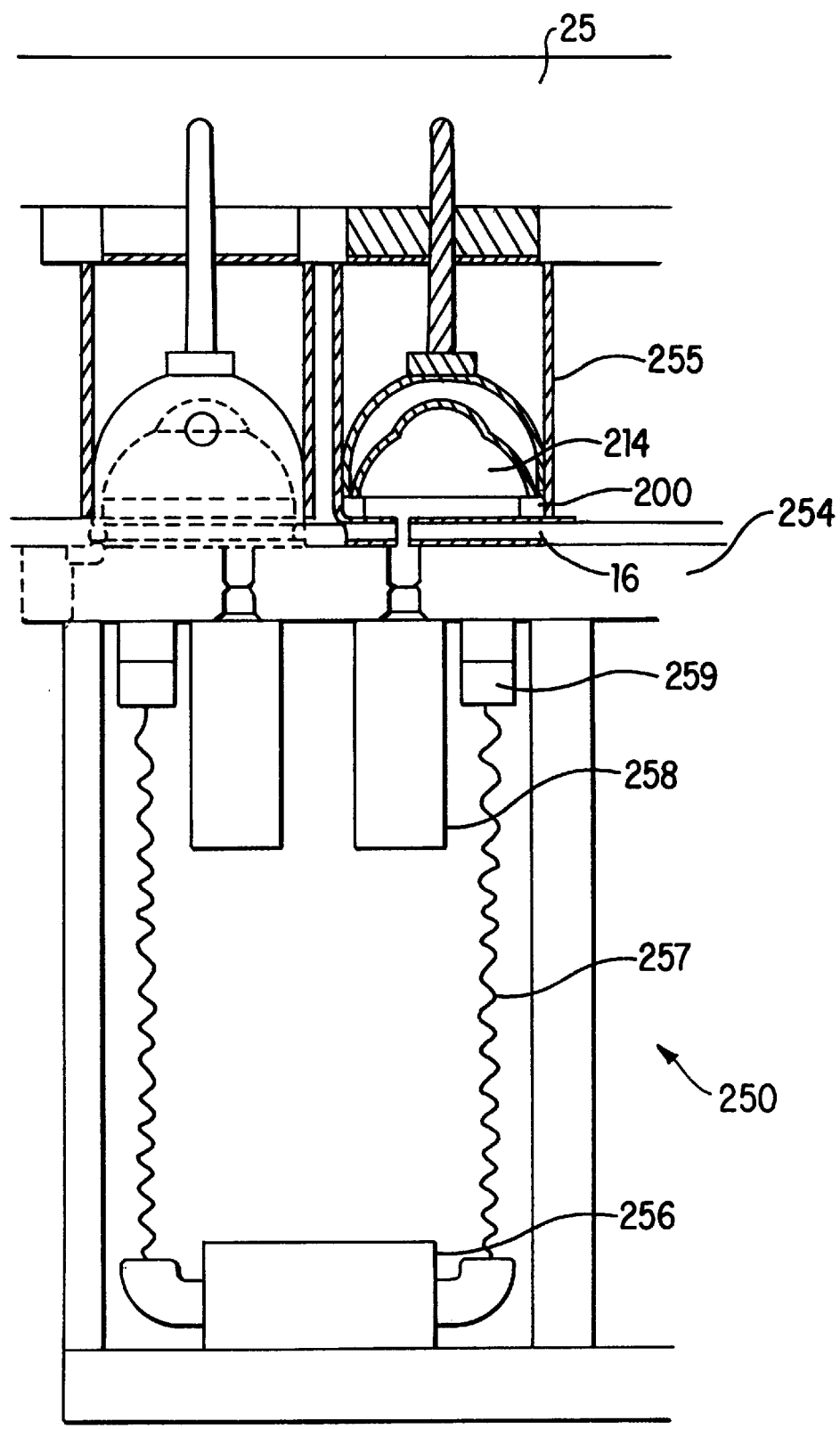
FIG. 19 is an elevation sectional view of an apparatus for testing the finished devices for defects.

Refer now to FIG. 19. Another embodiment of the invention comprises using an automated inspection system 250. The automated inspection system 250 is located along the manufacturing system after the vacuum forming system 80. The automated inspection system 250 positions the carrier plate 16 between a press platen 252 and a support platen 254. When the carrier plate 16 is positioned between the press platen 252 and the support platen 254 the automated inspection system 250 seals the bottom of the device 214. The device 214 is sealed by engaging the rim 200 with the seal cup 255 to create a seal. Air is pumped into the device 214 from the compressed air source 256 through air lines 257. Air pressure is built up within each device 214. The compressed air source 256 is shut off by a valve 259 when the device 214 has been administered a predetermined amount of air. A pressure transducer 258 measures the change in pressure in the device 214. Preferably the pressure is measured for several seconds. A loss of pressure indicates that a hole exists in the device 214. The devices 214 that exhibit a change in pressure measured by the pressure transducer 258 are identified and that information is passed to the ejection equipment in the unload station 100.

The chemical composition of the elastomeric material used in the above-described method and system for manufacturing elastomeric articles contributes to the manufacturing advantages. In addition to having certain characteristics to improve manufacturability, the elastomeric material should be capable of performing certain functions which may vary depending on the particular device that is being manufactured by the above-described method and depending on the particular use of the manufactured device. For example, when the device is used for intravaginal applications, certain physical characteristics are desired, as described below. In addition, use of the device for delivery of agents or substances such as, medicines, spermicide, anti-bacterial agents, and others, may be taken into account in determining the desired composition of the device.

When the first elastomeric portion is the rim 200 of the vaginal device described above, which may be used as a vaginal discharge collector, the material should produce a rim having a certain compression strength and hardness. Another important property of the rim material of such a device is its ability to relax and conform to the walls of the vagina as its temperature is increased from room temperature to body temperature. The compression hoop stress of a material refers to the self-restoring force of a device made of the material. As used herein, the term "compression hoop strength" means the force needed to maintain diametrically opposed portions of the elastomeric rim 200 in contact with each other when the rim 200 of an intravaginal device is at room temperature. An appropriate compression hoop strength for the rims 200 of an intravaginal device is from about two hundred and fifty grams to about one thousand grams. At these values, the self-restoring force of the elastomeric rim 200 is great enough to ensure that the rim 200 will expand with enough strength to form the desired seal against the wall of the vaginal canal, and to ensure that the device 214 will not become inadvertently dislodged, but not so great that the device is difficult to insert the device 214 or for it to contribute to cramping or cause other discomforts.

Hardness refers to the degree of stiffness of the material when it is in the shape of the rim 200. The rim 200 of the intravaginal device described should be stiff enough to maintain its shape and provide the desired elastomeric self-restoring force and yet flexible enough to adjust comfortably to individual shapes. The preferred balance between stiffness and flexibility for the material of the rim 200 is obtained when the material has a Shore A hardness of approximately fifty five to approximately seventy five, preferably sixty to seventy, according to the following test metho: ASTM D2240.

One way to produce an elastomeric portion having these characteristics would be to mix polyethylene with a thermoplastic elastomer (TPE). Low density polyethylene is a relatively hard and stiff material that provides stiffness to a blend, improves processibility, and is relatively inexpensive. Low density polyethylene enhances the weldability of the rim material to the reservoir material because polyethylene heat welds readily to itself. Since TPE's are relatively soft materials, their combination in appropriate proportions with low density polyethylene produces a blended material whose compression hoop strength and hardness vary depending on the amounts of polyethylene and TPE. For example, TPE's have anisotropic flow properties, which means that its molecular chains can be caused to orient during plastic flow to increase stiffness perpendicular to the direction of injection molding. Without the anisotropic flow properties, it would be difficult to achieve the desired stiffness perpendicular to the injection molding direction.

A preferred TPE is a styrenic-olefinic block copolymer marketed by Shell Chemical Company under the trademark "Kraton." The ratio of polyethylene to the TPE may be adjusted to control the stiffness and flexibility of the rim 200. A preferred ratio is about 1:2, polyethylene to TPE, but in may vary from about 50:50 to about 15:85. This material is preferred because it is toxicologically acceptable for internal wear, readily available, economical, and readily processible. In addition, the blend gives the rim 200 the proper springiness to maintain the friction fit within the carrier plate 16 and to provide a seal with the heat seal tool 50 and vacuum cavities 82.

When the second elastomeric portion is a nonplanar film reservoir portion 202 that is thermoformed from a planar sheet of elastomeric material 204, like in the embodiment described above, the elastomeric reservoir material should have many of the same performance characteristics as the rim material. For example, the film 204 must be able to be welded easily and it must be toxicologically acceptable for internal wear. The sheet of film 204 for menstruation applications is approximately 0.011 inches thick but may be between about 0.007 and about 0.020 inches thick. For other applications the thickness of the film 204 may be different. For example, for substance delivery applications, the thickness of the film 204 may be somewhat greater. A planar sheet is used because it is easier to handle and weld onto the rim 200 than a thin nonplanar elastomeric component. The finished thin film reservoir, for menstruation applications, is preferably approximately 0.002 inches thick at its thinnest point, but the thinnest portion's thickness may vary between about 0.002 and about 0.006 inches. For other applications the thickness of the film reservoir may be different. For example, for substance delivery applications, the thickness of the film reservoir may be somewhat greater. Therefore, if necessary, the film material should be able to be thermoformed to about twenty percent of its original thickness.

Use of a TPE/low density polyethylene formulation is preferable for the film formulation for many of the same reasons described above. A low density polyethylene/TPE mixture is nontoxic and produces good weld characteristics when welding to the rim because polyethylene is readily heat welded to itself. Controlling the ratio of polyethylene to TPE produces a desired level of stiffness and flexibility. A preferred ratio is about 1:2 but it may vary from about 50:50 to about 15:85. The film 204 formulation also performs well in the thermoforming process because it may be drawn deeply within the vacuum cavity 82 without creating holes or thin spots. Other performance advantages of this material include the material's soft and fleshy feel which make the device more comfortable, its quiet performance when compressed or wrinkled. The components are also readily available and economical.

Other types of thermoplastic elastomers could be used to make the devices 214, but these compounds would not necessarily provide the superior and reliable welding characteristics, the economics, or the product performances found in the above-described formulations of the rim 200 and film 204.

The above description and drawings are only illustrative of preferred embodiments of the present invention, and it is not intended that the present invention be limited thereto. Any modification of the present invention which comes within the spirit and scope of the following claims is to be considered part of the present invention.

What is claimed is:

1. An apparatus for the manufacture of a cup-shaped device having an elastomeric rim and a first elastomeric portion, said apparatus comprising:
   a load station for loading said elastomeric rim onto a carrier device;
   a heat seal station for applying said first elastomeric portion to said elastomeric rim;
   a preheat station to raise the temperature of said elastomeric rim and said first elastomeric portion from a first temperature to a second temperature;
   a forming station for forming the first elastomeric portion of the cup-shaped device into a nonplanar shaped hollow reservoir;
   an unloading station for unloading said cup-shaped device; and
   a transferring system for transferring said carrier device to said heat seal station, preheat station, forming station, and unloading station.

2. The apparatus according to claim 1, wherein said forming station is a vacuum form station for vacuum forming the first elastomeric portion into a nonplanar shaped hollow reservoir.

3. The apparatus according to claim 2, wherein said elastomeric rim is held in the carrier device by a friction fit.

4. The apparatus according to claim 3, wherein the carrier device frictionally contacts an outer surface of said elastomeric rim.

5. The apparatus according to claim 4, wherein the carrier device has openings at the top and bottom of said elastomeric rim.

6. The apparatus according to claim 1, wherein said loading station comprises a means to orient said elastomeric rim for placement into said carrier device.

7. The apparatus according to claim 6, wherein said means to orient said elastomeric rim comprises visual inspection means to orient a vestige formed on said elastomeric rim.

8. The apparatus according to claim 7, wherein said visual inspection means is arranged to visually inspect said elastomeric rim and relay a signal to an orienting device so that said elastomeric rim is oriented with the vestige facing upward in said carrier device.

9. The apparatus according to claim 8, wherein said visual inspection means includes a camera.

10. The apparatus according to claim 7, wherein said apparatus additionally includes means to inspect the flatness and roundness of said rim.

11. The apparatus according to claim 1, wherein said first elastomeric portion is a film which is pulled over said carrier device housing a plurality of said elastomeric rims.

12. The apparatus according to claim 11, wherein said heat seal station comprises a means to weld said first elastomeric portion in a film to said elastomeric rim.

13. The apparatus according to claim 12, wherein said heat seal station further comprises a means to cut any excess film away from said elastomeric rim.

14. The apparatus according to claim 13, wherein said pre-heat station preheats said cup-shaped device from the first temperature to the second temperature while said first elastomeric portion is in the form of a film welded onto said elastomeric rim.

15. The apparatus according to claim 1, wherein said apparatus additionally comprises a testing means to determine whether said cup-shaped device has been adequately formed.

16. The apparatus according to claim 15, wherein said testing means comprise pressure testing means.

17. An apparatus for the manufacture of cup-shared devices, said apparatus comprising:

a load station for loading said elastomeric rims onto a carrier device, wherein said carrier device comprises a plurality of openings, and wherein each one of said openings is arranged to contain one of said cup-shaped devices;

a heat seal station for applying an elastomeric sheet to said elastomeric rims;

a forming station for forming portions of said sheet into nonplanar-shaped hollow reservoirs; and a transferring system for transferring said carrier device to said heat seal station and said forming station.

* * * * *